(12) United States Patent
Ajami et al.

(10) Patent No.: US 11,174,793 B2
(45) Date of Patent: Nov. 16, 2021

(54) HYDRAULIC STARTER ASSEMBLY FOR A GAS TURBINE ENGINE

(71) Applicant: United Technologies Corporation, Farmington, CT (US)

(72) Inventors: Andre M. Ajami, Palm City, FL (US); Sami Chukrallah, West Palm Beach, FL (US); Richard M. Marshall, Loxahatchee, FL (US); Ryan W. Hunter, North Palm Beach, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 249 days.

(21) Appl. No.: 16/135,455

(22) Filed: Sep. 19, 2018

(65) Prior Publication Data

US 2020/0088103 A1 Mar. 19, 2020

(51) Int. Cl.
*F02C 7/27* (2006.01)
*F02C 7/32* (2006.01)

(52) U.S. Cl.
CPC ............... *F02C 7/27* (2013.01); *F02C 7/32* (2013.01); *F05D 2220/32* (2013.01); *F05D 2220/50* (2013.01); *F05D 2260/406* (2013.01); *F05D 2260/85* (2013.01)

(58) Field of Classification Search
CPC .. F02C 7/27; F02C 7/272; F02C 7/275; F02C 7/277; F02C 7/32; F02N 11/0848; F02N 2200/02; F05D 2260/85
See application file for complete search history.

(56) References Cited

U.S. PATENT DOCUMENTS

| 3,170,450 | A | | 2/1965 | Kent et al. | |
|---|---|---|---|---|---|
| 4,315,422 | A | | 2/1982 | Cordner | |
| 4,702,273 | A | | 10/1987 | Allen et al. | |
| 4,736,726 | A | | 4/1988 | Matsuno et al. | |
| 5,237,815 | A | | 8/1993 | McArthur | |
| 5,428,275 | A | * | 6/1995 | Carr ........................ | F02N 11/04 318/146 |
| 5,667,051 | A | | 9/1997 | Goldberg et al. | |
| 5,722,728 | A | | 3/1998 | Lampe et al. | |
| 6,035,626 | A | * | 3/2000 | Wahl ...................... | F02C 7/275 290/40 A |
| 7,216,489 | B2 | | 5/2007 | Uluyol et al. | |

(Continued)

FOREIGN PATENT DOCUMENTS

EP 3318726 5/2018

OTHER PUBLICATIONS

European Search Report for European Patent Application No. 19198154.7 completed Jan. 24, 2020.

(Continued)

*Primary Examiner* — Scott J Walthour
(74) *Attorney, Agent, or Firm* — Carlson, Gaskey & Olds, P.C.

(57) ABSTRACT

A starter assembly for a gas turbine engine according to an example of the present disclosure includes, among other things, a fluid-actuated starter coupled to a spool, and a controller operable to cause a reduction in torque output of the starter in response to determining that a first predefined threshold is met. The first predefined threshold relates to an engine operational condition. A method for starting a gas turbine engine is also disclosed.

20 Claims, 7 Drawing Sheets

(56) References Cited

U.S. PATENT DOCUMENTS

| | | | |
|---|---|---|---|
| 7,250,688 B2 | 7/2007 | Thomson et al. | |
| 8,666,633 B2 | 3/2014 | Ertz et al. | |
| 8,808,142 B2 | 8/2014 | Al-Khairy | |
| 9,464,589 B2 | 10/2016 | Grumer et al. | |
| 2011/0259016 A1* | 10/2011 | Winston | F02C 7/26 60/778 |
| 2012/0266606 A1* | 10/2012 | Zeiner | F02C 7/277 60/788 |
| 2013/0204506 A1* | 8/2013 | Ertz | F02N 11/04 701/100 |
| 2016/0065106 A1 | 3/2016 | Venter | |
| 2017/0016398 A1 | 1/2017 | Thiriet et al. | |
| 2018/0298777 A1* | 10/2018 | Nguyen | F02C 7/06 |

OTHER PUBLICATIONS

Trinkel, B. (2006). Chapter 4: ISO symbols. Hydraulics & Pneumatics. Retrieved from: https://www.hydraulicspneumatics.com/other-technologies/chapter-4-iso-symbols.

Technical Information. Solenoid valve types. Retrieved Aug. 21, 2018 from: https://tameson.com/solenoid-valve-types.html.

Gonzalez, C. (2017). What's the difference between hydraulic circuit symbols? MachineDesign. Retrieved Aug. 21, 2018 from: https://www.machinedesign.com/motion-control/what-s-difference-between-hydraulic-circuit-symbols.

* cited by examiner

HYDRAULIC STARTER ASSEMBLY FOR A GAS TURBINE ENGINE

BACKGROUND

This disclosure relates to a gas turbine engine, and more particularly to starting an engine relative to an engine light-off condition.

Gas turbine engines typically include a compressor section and a turbine section. The air is compressed in the compressor section. From the compressor section the air is introduced into a combustor section where it is mixed with fuel and ignited in a combustor. Products of this combustion pass downstream over a turbine section to extract energy for driving the compressor section. Gas turbine engines can be utilized to provide propulsion and/or auxiliary power to an aircraft and components thereof.

Gas turbine engines can utilize hydraulic starters to provide motive power prior to engine light-off. An engine light-off event occurs when combustion in the combustor has commenced and the turbine section begins to provide torque without complete assistance of a starter.

SUMMARY

A starter assembly for a gas turbine engine according to an example of the present disclosure includes a fluid-actuated starter coupled to a spool, and a controller operable to cause a reduction in torque output of the starter in response to determining that a first predefined threshold is met. The first predefined threshold relates to an engine operational condition.

In a further embodiment of any of the foregoing embodiments, the controller causes an increase in torque output of the starter in response to determining that a second predefined threshold is met subsequent to the first predefined threshold being met. The second predefined threshold relates to the engine operational condition.

In a further embodiment of any of the foregoing embodiments, the engine operational conditional is an engine light-off condition.

In a further embodiment of any of the foregoing embodiments, the second predefined threshold is greater than the first predefined threshold. The controller is operable to cause the reduction in torque output of the starter in response to determining that a present rotational speed of the spool meets the first predefined threshold. The controller is operable to cause the increase in torque output of the starter in response to determining that the present rotational speed of the spool meets the second predefined threshold. The first threshold is a first percentage of a maximum rotational speed of the spool, and the second threshold is a second percentage of the maximum rotational speed of the spool.

A further embodiment of any of the foregoing embodiments includes a variable speed pump driven by a motor. The controller is operable to modulate a speed of the motor to adjust a flow rate of fluid between a fluid source and the starter.

A further embodiment of any of the foregoing embodiments includes a valve assembly coupled to the starter. The controller is operable to move the valve assembly to cause a flow rate of fluid between a fluid source and the starter to change in response to the first predefined threshold being met.

In a further embodiment of any of the foregoing embodiments, the valve assembly includes at least one servo valve electrically coupled to the controller.

In a further embodiment of any of the foregoing embodiments, the valve assembly includes at least one pulse width modulated (PWM) valve electrically coupled to the controller.

In a further embodiment of any of the foregoing embodiments, the valve assembly includes at least one solenoid valve electrically coupled to the controller.

In a further embodiment of any of the foregoing embodiments, the at least one solenoid valve includes a first solenoid valve and a second solenoid valve, the flow rate of fluid including a first rate and a second rate greater than the first rate. The first rate is defined by the first solenoid valve and the second rate defined by the second solenoid valve.

In a further embodiment of any of the foregoing embodiments, the valve assembly includes an altitude bellows that modulates flow of fluid to the at least one solenoid valve.

In a further embodiment of any of the foregoing embodiments, the spool is a portion of an auxiliary power unit.

A gas turbine engine assembly according to an example of the present disclosure includes a spool that has a turbine section driving a compressor section or a fan, a combustor section that has a combustor in fluid communication with the compressor and the turbine, and a starter assembly that has a fluid-actuated starter mechanically coupled to the spool and fluidly coupled to a fluid source and a controller operable to vary a flow rate of fluid between the fluid source and the starter in response to determining that a first predefined threshold is met. The first predefined threshold relates to an engine operational condition of the combustor.

A further embodiment of any of the foregoing embodiments includes an auxiliary power unit, the auxiliary power unit comprising the spool and the combustor section.

In a further embodiment of any of the foregoing embodiments, the controller is operable to cause an increase in torque output of the starter in response to determining that a second predefined threshold is met. The second predefined threshold relates to the engine operational condition.

A method for starting a gas turbine engine according to an example of the present disclosure includes determining a present condition of a gas turbine engine component, communicating fluid from a fluid source to a fluid-actuated starter, the starter coupled to the gas turbine engine component, and causing a flow rate of the fluid between the fluid source and the starter to be reduced in response to determining that the present condition meets a first predefined threshold. The first predefined threshold relating to an engine operational condition.

In a further embodiment of any of the foregoing embodiments, the engine operational conditional is an engine light-off condition. The gas turbine engine component is a portion of an auxiliary power unit comprising a combustor section, and the engine light-off condition corresponds to the combustor section.

A further embodiment of any of the foregoing embodiments, the method includes causing the flow rate of the fluid to increase in response to determining that the engine operational condition has occurred.

In a further embodiment of any of the foregoing embodiments, the step of causing the flow rate of the fluid to increase includes causing the starter to approach a maximum torque output.

In a further embodiment of any of the foregoing embodiments, the present condition corresponds to a present rotational speed of the gas turbine engine component. The step of determining that the engine operational condition has occurred includes determining that the present rotational speed meets a second predefined threshold, and the second predefined threshold is greater than the first predefined threshold.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
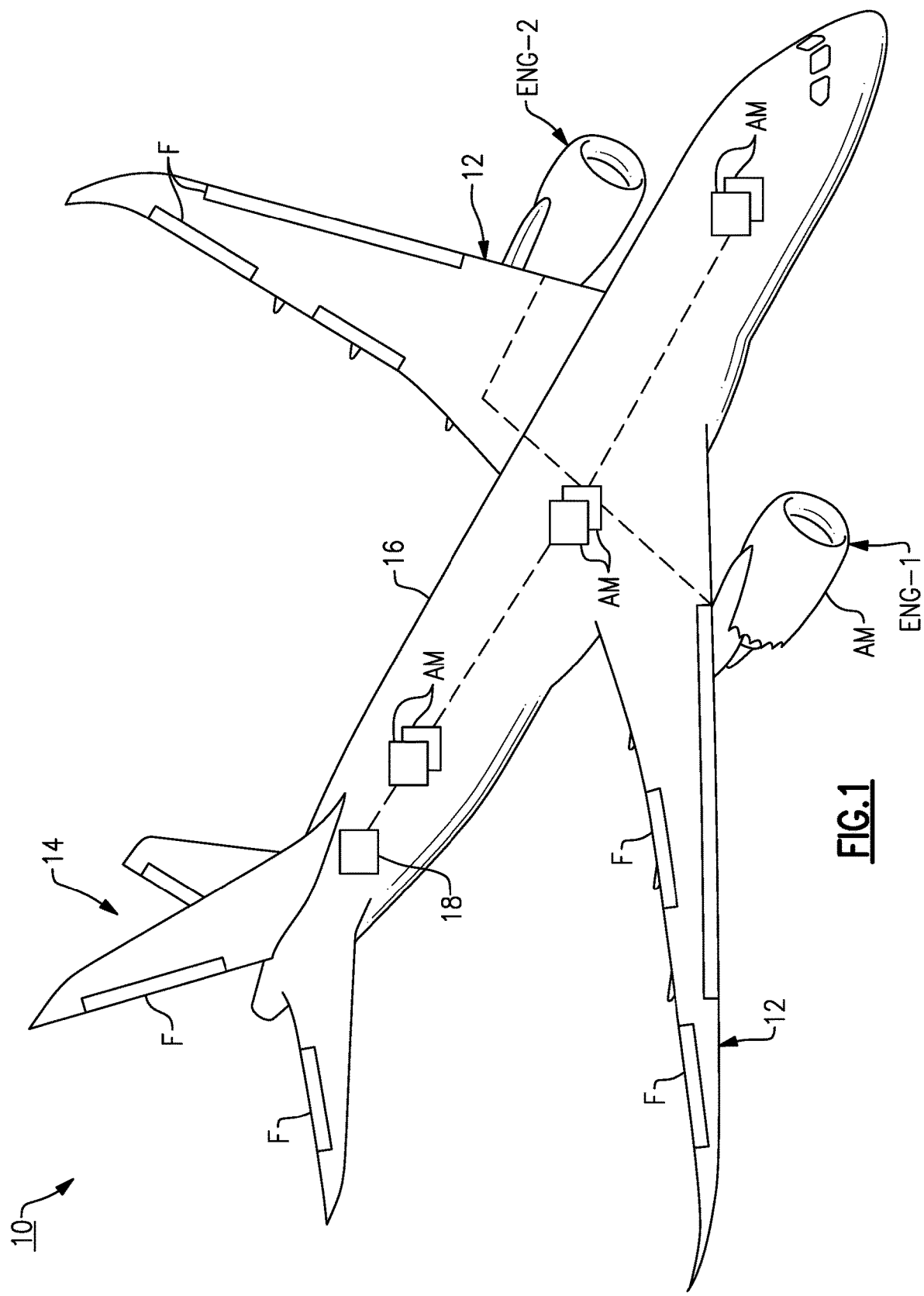
FIG. 1 shows an exemplary aircraft.

FIG. 1 illustrates a vehicle or aircraft 10 according to an example. The aircraft 10 includes a pair of wings 12 and a tail section 14 that extend from a body or fuselage 16. The aircraft 10 can include mechanical loads such as pivotable flaps F.

The aircraft 10 includes a plurality of vehicle systems or aircraft modules AM distributed at various discrete locations of the aircraft 10. The aircraft modules AM can communicate with or otherwise be coupled one another. The aircraft modules AM include hardware and/or software to provide functionality to operate and control the aircraft 10.

Example aircraft modules AM can include avionics systems, cockpit, visualization and display systems, communications and navigation systems, input/output (I/O) modules to interconnect with other systems and modules of the aircraft 10, engine and fuel systems, electrical and auxiliary power systems, environment control systems (ECS), fire protection systems, galley control systems, lighting systems, water and waste systems, landing gear systems, diagnostics systems, and other known systems, for example. The aircraft modules AM include one or more engines to provide propulsion, such as a pair of engines ENG-1, ENG-2 attached to the wings 12.

The aircraft modules AM can communicate with a power source 18 such as an auxiliary power unit (APU) which provides an on-board source of auxiliary electrical and/or electrical power to other aircraft modules AM including engine 20 (shown in FIG. 2), for example. The APU can include a gas turbine engine that drives an electrical generator and/or gearbox, for example. Although the teachings herein primary refer to an aircraft, such as a fixed wing or rotary aircraft, other vehicle systems can benefit from the teachings herein, including other aerospace systems such as space vehicles and satellites, ground-based vehicles and power generation systems, and marine systems.

Figure 2:
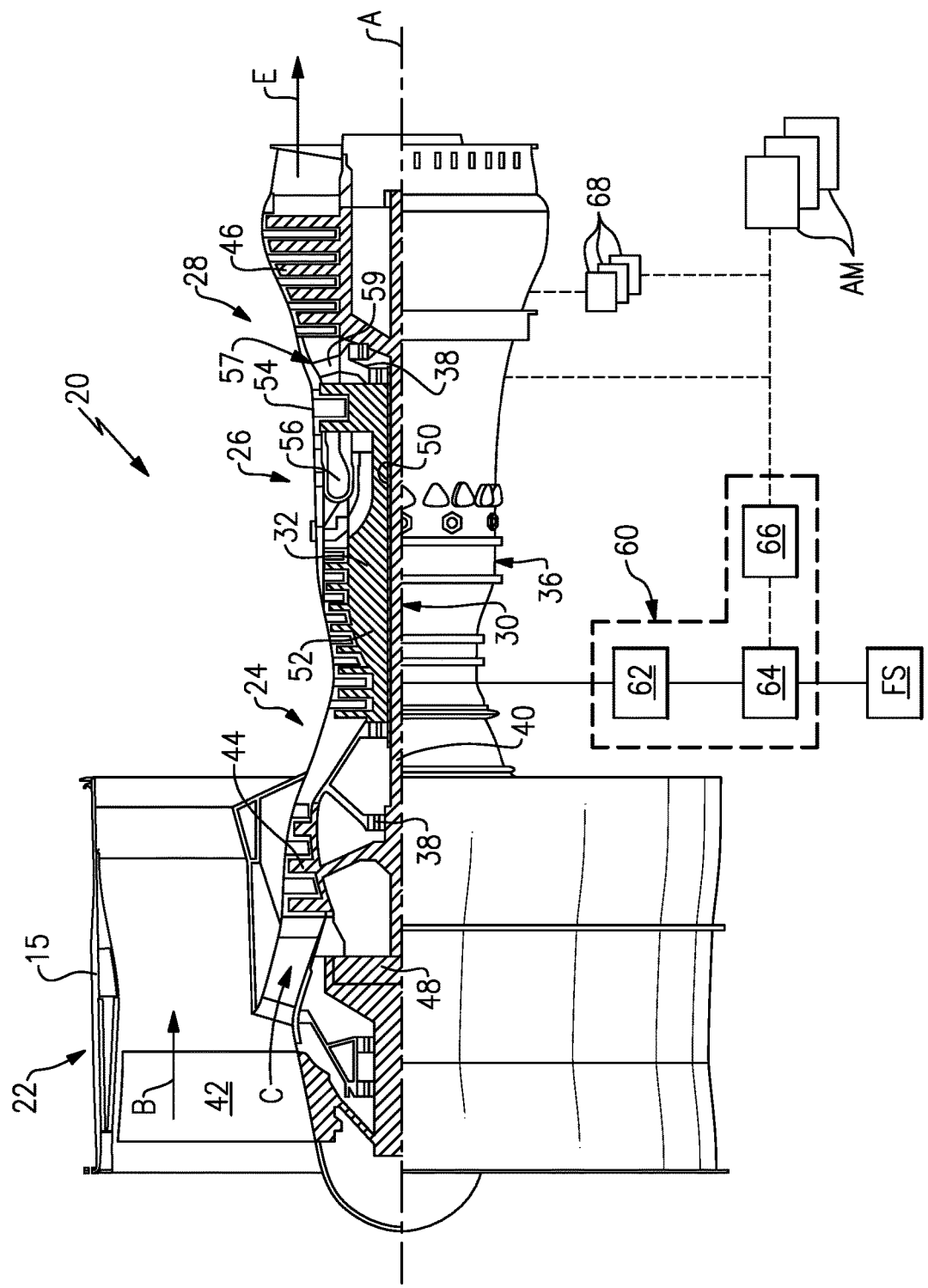
FIG. 2 illustrates a gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

The engine 20 can be coupled to a starter assembly 60 operable to selectively drive one of the shafts 40, 50 or another portion of the spools 30, 32 during engine startup. In this disclosure, like reference numerals designate like elements where appropriate and reference numerals with the addition of one-hundred or multiples thereof designate modified elements that are understood to incorporate the same features and benefits of the corresponding original elements.

The starter assembly 60 includes a fluid-actuated starter 62 mechanically coupled to one of the spools 30, 32. The starter assembly 60 includes a valve assembly 64 coupled to, and fluidly interconnecting, a fluid source FS and the starter 62. In the illustrated example of FIG. 2, the starter 62 is hydraulic starter selectively powered by pressurized liquid. In other examples, the starter 62 is a pneumatic starter coupled to a pressurized airflow source or a fueldraulic starter coupled to a pressurized fuel source. The valve assembly 64 is operable to meter flow between the fluid source FS and the hydraulic starter 62.

The starter assembly 60 can include a controller 66 coupled to the valve assembly 64. The controller 66 is operable to modulate or otherwise move the valve assembly 64 to meter flow between the fluid source FS and starter 62 during engine startup. The controller 66 can be coupled to the engine 20 and other aircraft systems AM to communicate data, signals and/or other information. For example, the controller 66 can be coupled to one or more sensors 68 that measure one or more conditions of the engine 20 or aircraft 10. Example conditions include engine parameters such as a present rotational speed (N) of the spools 30, 32 and an exhaust gas temperature (EGT) of exhaust gases E exiting the engine 20. Other example conditions include velocity and altitude of the aircraft 10.

Figure 3:
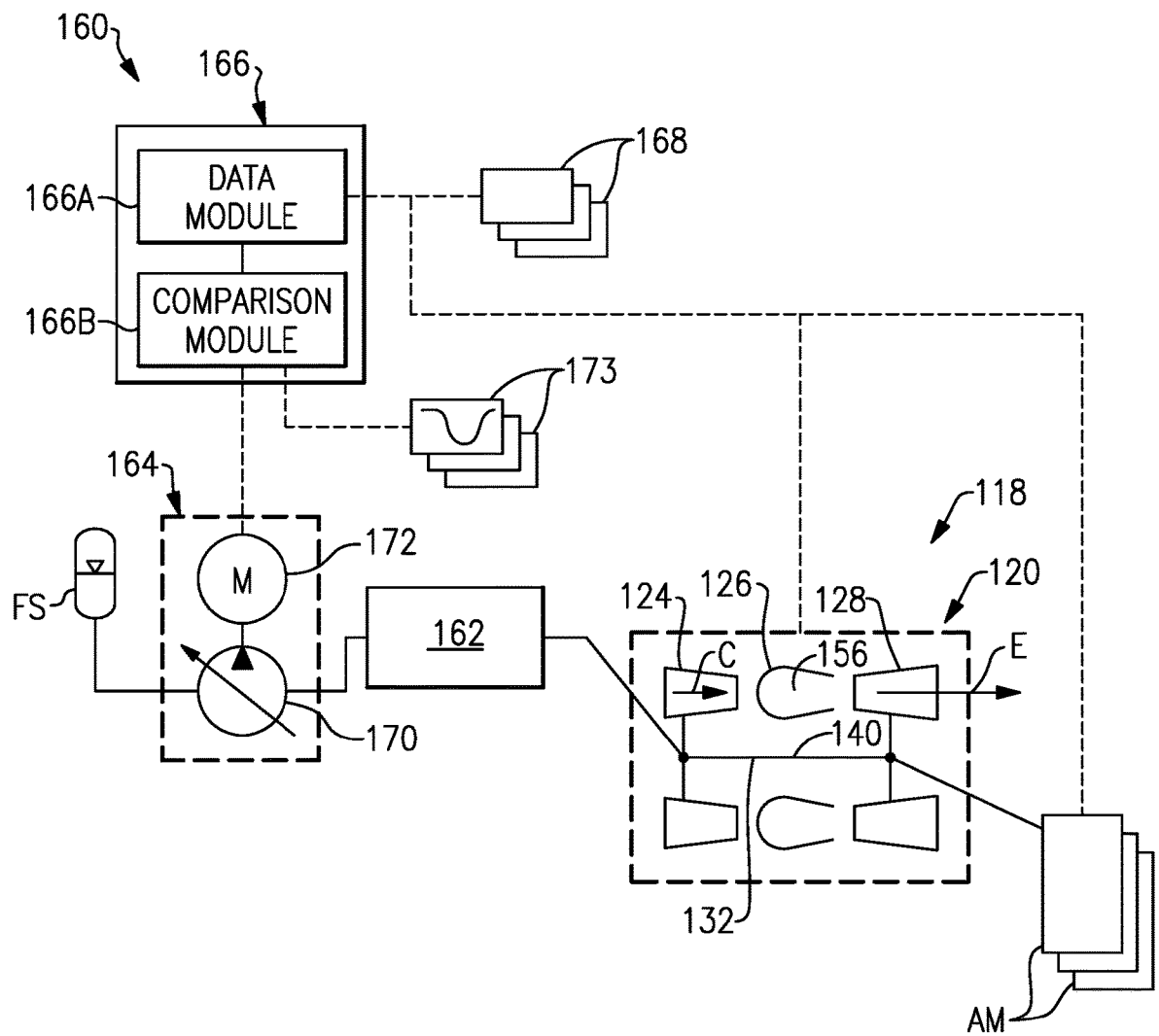
FIG. 3 illustrates an exemplary starter assembly for a gas turbine engine.

FIG. 3 illustrates a starter assembly 160 for a gas turbine engine according to another example. A gas turbine engine 120 includes a spool 132 defined by a compressor section 124 including at least one compressor and a turbine section 128 including at least one turbine. The engine 120 includes a combustor section 126 including a combustor 156 in fluid communication with the compressor and turbine sections 124, 128.

The starter assembly 160 includes a fluid-actuated, hydraulic starter 162 mechanically coupled to a shaft 140 of the spool 132. The starter assembly 160 is operable to rotate or otherwise move shaft 140 during engine startup. The starter assembly 160 includes a valve assembly 164 that fluidly couples the starter 162 to a fluid source FS. The valve assembly 164 is operable to fluidly couple and meter flow between the fluid source FS and starter 162 in response to a controller 166 coupled to the valve assembly 164. The fluid source FS is operable to communicate fluid to the starter 162, such as airflow or hydraulic fluid including lubricant and fuel. Fluid source FS can be an accumulator such as an aircraft hydraulic reservoir, for example.

The spool 132 can be a portion of an APU. In the illustrative example of FIG. 3, engine 120 is an APU that serves as a power source 118 to supply power to aircraft module(s) AM. The engine 120 is operable to supply auxiliary power to engine 20 or one or more other aircraft modules AM during operation of the aircraft 10. Although the teachings herein primarily refer to an APU having a single spool gas turbine engine, other engine architectures can benefit from the teachings herein, including multi-spool architectures. The starter assembly 160 can be utilized to drive other systems such as engine 20 or engine packages ENG-1, ENG-2.

The valve assembly 164 includes a pump 170 driven by a motor 172. In the illustrative example of FIG. 3, the pump 170 is a variable speed pump that is continuously variable across an infinite range of speeds to meter flow and/or pressure between the fluid source FS and starter 162 in response to the motor 172. The controller 166 is operable to modulate a speed of the motor 172 to adjust a flow rate of fluid between the fluid source FS and the starter 162.

The controller 166 can be an analog and/or digital device. For example, the controller 166 can include a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the method for starting and operation of the disclosed starter assemblies of this description. The interface facilitates communication with the other systems or components of the engine or aircraft, for example. In examples, the controller 166 is incorporated into a portion of an engine control, such as a full authority digital engine control (FADEC) or electronic engine control (EEC), another system, or a stand-alone system.

The controller 166 includes a data module 166A in communication with a comparison module 166B. Controller 166 can be programmed to execute the data module 166A and comparison module 166B as one or more software instructions, for example. The data module 166A can be coupled to one or more sensors 168, aircraft modules AM and/or engine 120.

Each sensor 168 is operable to detect one or more conditions of the engine 20 or aircraft 10. For example, the sensors 168 can be operable to detect a present rotational speed of a gas turbine engine component of the engine 20. In some embodiments, the gas turbine engine component is a rotatable shaft, such as shaft 140 or one of shafts 40, 50 (FIG. 2). The sensors 168 are operable to detect a present temperature of gasses in core flow path C and/or an exhaust stream E communicated from or otherwise exiting turbine section 128 of engine 120. The "present" rotational speed or temperature corresponds to a signal sensed within a timeframe that accounts for signal propagation between the various components including the controller 166 and respective sensor(s) 168.

The data module 166A is programmed to access the data during one or more conditions or events associated with component(s) of the engine 120, such as engine startup prior to, during and subsequent to occurrence of engine light-off. For the purposes of this disclosure, an "engine startup event" means a condition in which the engine is moved from rest at least until occurrence of engine light-off.

The data module 166A communicates with one or more subsystems of the engine 120 and/or other aircraft modules AM of an aircraft associated with the engine 120.

The comparison module 166B is operable to determine an engine light-off condition or event or other engine operational condition(s) of a gas turbine engine, such as one of engines 20, 120. Various techniques can be utilized to determine an occurrence of engine light-off condition or event. As is known, example techniques for determining an engine light-off event include evaluating a present rotation speed of a spool, an instantaneous change or rise in acceleration rate (Ndot) of the spool, and/or a rise in present EGT of the exhaust gases E. One would understand how to program the controller 166 to determine an occurrence of engine light-off event in view of the teachings herein.

The starter 162 is moveable to define a minimum torque output and a maximum torque output. In some scenarios, the starter 162 may accelerate from rest during an engine start mode to drive the spool 132 such that starter 162 approaches the maximum torque output. A rate of acceleration of the starter 162 may occur such that an amount of time that the engine 120 operates in a predefined engine light-off window or period is insufficient, which may reduce a likelihood that engine light-off occurs. The relatively high torque output of the starter 162 can also cause a rotational speed of the spool 132 to exceed a predetermined threshold during a predefined light-off period such that an air/fuel mixture in the combustor 156 is below or above a predefined range corresponding to a likely engine light-off event. The predefined light-off period can be defined as an operating mode in which ignition and fuel flow to combustor 156 are sufficient to cause the combustor achieve engine light-off. High altitude operating conditions may require a relatively longer light-off period than lower altitude operations due to relatively thinner air, or may require an increase in rotational speed of the spool 132 to cause an increase in airflow into the engine 120, for example.

The controller 166 is operable to set or reduce torque output of the starter 162 below a maximum torque output to momentarily to slow down acceleration of the spool 132 and increase a duration that the engine 120 operates in the predefined light-off period or speed regime. The controller 166 is programmed with control logic to regulate flow to the starter 162 during a startup sequence of the engine 120, including regulating flow in a controlled or restricted manner during the predefined light-off period. Utilizing the techniques disclosed herein, a duration that the engine 120 operates in the predefined light-off period can be increased by three to four times or more as compared to operating the starter 162 solely at a maximum torque output, which can increase a likelihood of engine light-off and engine start. The teachings herein can be utilized for cold starting, mid-air starting, and low altitude or high altitude conditions, for example.

The controller 166 is operable to set or cause a reduction in the torque output of the starter 162 such that the engine 120 operates at a reduced acceleration rate for a duration that meets or at least approaches the predefined light-off period, such as in response to determining that one or more predefined thresholds relating to an engine light-off condition or other engine operational condition(s) of the engine are met. For example, when entering into an engine startup mode, the controller 166 is operable to modulate the motor 172 to cause the starter 162 to operate at the maximum torque output to overcome an inertia of the engine 120. The controller 166 is operable to vary or set a flow rate and/or pressure of fluid between the fluid source FS and starter 162 to cause a reduction in torque output of the starter 162 in response to determining that a first predefined threshold is met, and is operable to cause an increase in torque output of the starter 162 in response to determining that a second predefined threshold is met, which can occur subsequent to the first predefined threshold being met. The first and second predefined thresholds can relate to an engine light-off condition of the combustor 156 or other engine operational condition(s) of the engine. The first and second predefined thresholds can be first and second predefined thresholds T1, T2 of FIG. 5, for example.

The controller 166 can be programmed in a number of ways to modulate the valve assembly 164 for light-off and an acceleration sequence of the engine 120. For example, the comparison module 166B is operable to cause a reduction in torque output of the starter 162 in response to determining that a present rotational speed (N) of the spool 132 meets the first predefined threshold, and is operable to cause an increase in torque output of the starter 162 in response to determining that the present rotational speed (N) of the spool 132 meets the second predefined threshold. The second predefined threshold can be greater than the first predefined threshold. For example, the first threshold can be a first percentage of maximum rotational speed (Nmax) of the spool 132, such as between 1% and 5% of Nmax or about 3% of Nmax, and the second threshold can be a second percentage of Nmax, such as between 8% and 12% or greater than or about 10% of Nmax.

The controller 166 can be programmed to access and execute one or more predefined torque curves 173. Each torque curve 173 can be defined with respect to each operating condition or mode of the starter 162 or valve assembly 164. The torque curves 173 can be incorporated as one or more lookup tables or equations stored in memory. The controller 166 is programmed to modulate or control the valve assembly 162 according to the torque curve(s) 173. In examples, the controller 166 is programmed to select a setting along the respective torque curve 173 based on one or more conditions of the engine 20 or aircraft 10, including any conditions disclosed herein. Other example curves 173 can be defined with respect to spool speed (N), EGT, aircraft altitude and velocity, and hydraulic pressure at a location between the fluid source FS and starter 162. In some examples, the controller 166 is programmed to select the setting along the respective torque curve 173 to assist with controlling an acceleration schedule or rate (Ndot) of the engine 120 to reduce a likelihood of over-fueling or lean blow out of the combustor 156, for example.

Figure 4:
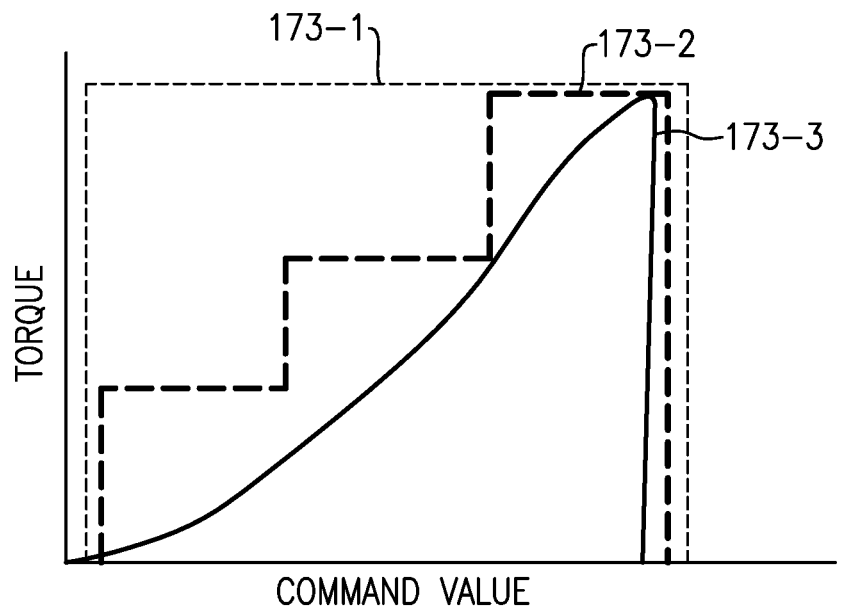
FIG. 4 illustrates example torque curves for operation of a starter assembly.

FIG. 4 illustrates example torque curves 173-1, 173-2 and 173-3. Torque curve 173-1 can be defined to have a high torque setting and a zero torque setting for a two-position valve. Torque curve 173-2 can be defined to have low, medium and high torque settings, in addition to a zero torque setting, for a three-position, multi-stage valve. Torque curve 173-3 can be defined for a continuous range of torque settings for a variable speed pump or continuously variable valve to control the starter 162 between 0% and 100% of the maximum torque output. Torque curve 173-1 can be linear or non-liner such as a curve as shown.

Figure 5:
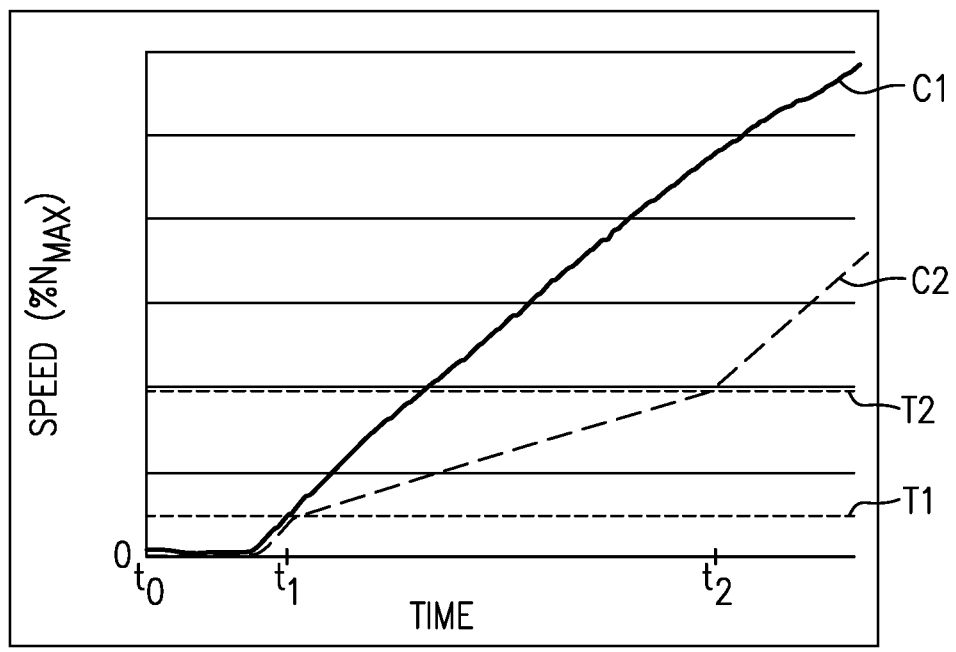
FIG. 5 illustrates an example plot of curves for operation of a starter assembly.

Referring to FIG. 5, with continued reference to FIG. 3, curves C1 and C2 are disclosed for two different engine startup scenarios. Curve C1 corresponds to operation of an on/off starter at maximum torque output. Curve C2 corresponds to operation of the starter 162 during a plurality of modes. A first mode can be defined between time=$t_0$ and time <$t_1$, a second mode can be defined between time=$t_1$ and time <$t_2$, and a third mode can be defined as time >=$t_2$, for example. The controller 166 is operable to move the valve assembly 164 to cause a flow rate and/or pressure of fluid between the fluid source FS and the starter 162 to change in response to determining that one or more predefined thresholds are met, such as first and/or second predefined thresholds T1, T2. Although two predefined thresholds are disclosed in FIG. 5, it should be understood that fewer or more than two predefined thresholds can be utilized with the teachings disclosed herein. A predefined light-off period of the engine 120 can be defined between 5% and 10% of Nmax, for example.

The controller 166 can be operable to modulate the valve assembly 164 such that the starter 162 operates at a relatively higher torque output such as maximum torque output during the first mode, operates at a relatively lesser torque output during the second mode in response to determining that the first predefined threshold T1 is met, and operates at a relatively higher torque output such as maximum torque output during the third mode in response to determining that the second predefined threshold T2 is met. The controller 166 causes the starter 162 to operate in the predefined light-off period for a relatively greater amount of time relative to curve C2 as compared to curve C1 due to a reduction in acceleration of the starter 162 during the second mode.

Figure 6:
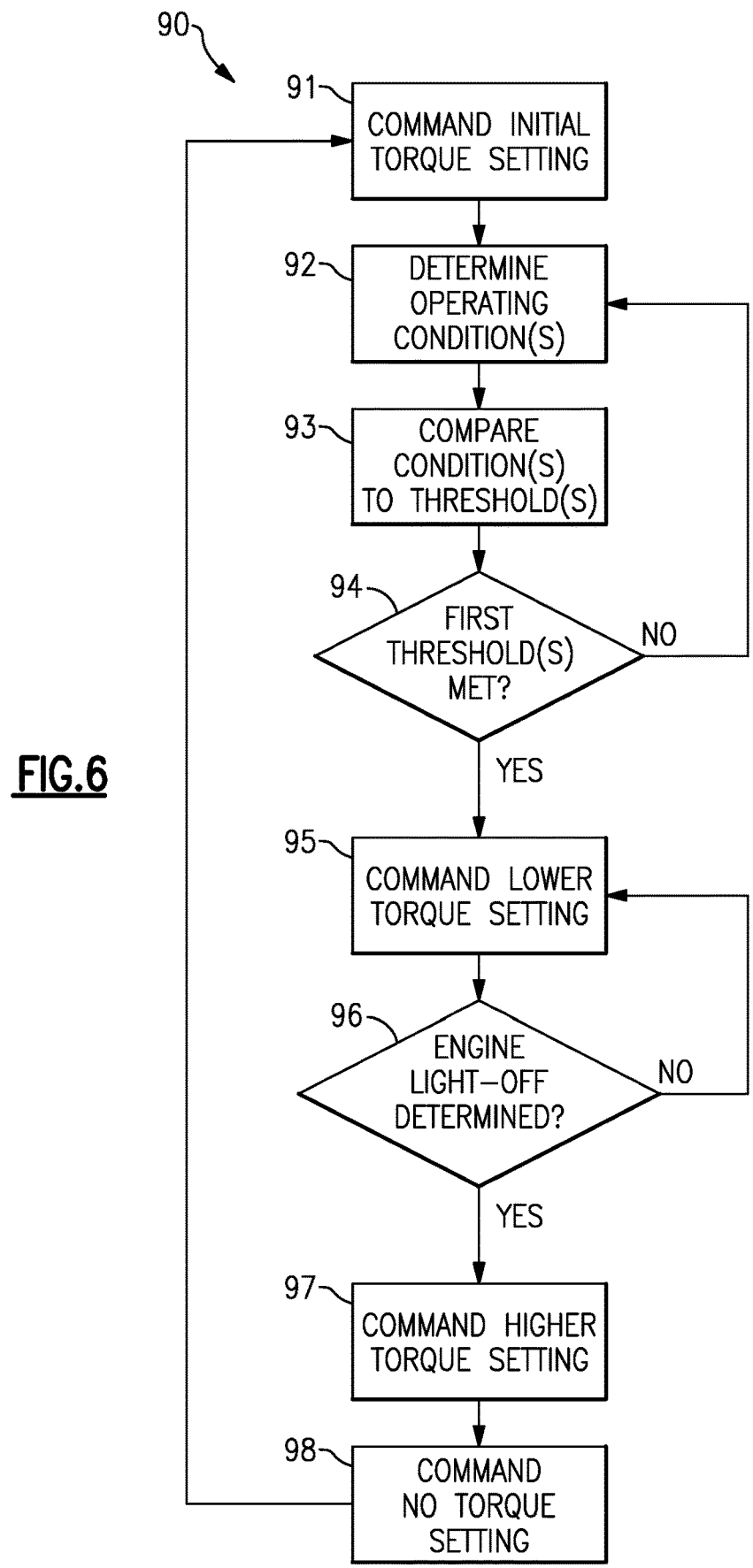
FIG. 6 illustrates an exemplary process for starting a gas turbine engine.

FIG. 6 illustrates an exemplary process or algorithm in a flowchart 90 for starting a gas turbine engine. The algorithm 90 can be utilized with power source 18 of FIG. 1 and starter assemblies 60, 160 of FIGS. 2 and 3. Controllers 66 and 166 can be programmed to execute the algorithm 90 to control starter 62 or 162.

At step 91, a fluid-actuated starter coupled to a gas turbine engine component is commanded to operate at an initial torque setting, such as a relatively high or maximum torque output, or a relatively low torque output. Step 91 can include modulating a position of a valve assembly to communicate fluid and set a flow rate from a fluid source to the starter such that the starter begins to move the gas turbine engine component.

At step 92, one or more operating or present conditions of the engine and/or aircraft associated with the engine are determined, including any of the conditions disclosed herein including a present rotational speed of the gas turbine engine component, EGT, and a condition of the aircraft.

At step 93, the operating conditions are compared to one or more predetermined criterion, such as at least one predefined threshold relating to an engine light-off condition or another engine operational condition. Although algorithm 90 is primarily disclosed with respect to an engine light-off condition, the predetermined criterion can relate to another engine operational condition. The predefined threshold(s) can include any of the thresholds disclosed herein. In examples, the predefined threshold is a predefined time threshold with respect to an elapsed time relative to the commencement of step 91 or another phase of the startup sequence.

At step 94, the algorithm determines whether or not the one or more predetermined criterion are met, such as the first predefined threshold. At step 95, the starter is commanded to operate at a relatively lower torque setting in response to determining that the one or more predetermined criterion are met. Step 95 includes causing a flow rate and/or pressure of fluid between the fluid source and starter to be reduced in response to determining that the condition(s) meet the first predefined threshold. Step 95 can include causing a reduction in acceleration of the starter.

At step 96, the algorithm determines whether or not an engine light-off condition or event or another engine operational condition associated with the engine has occurred. Step 96 can include comparing one or more conditions of the engine to each respective predetermined criterion, including any of the conditions and thresholds disclosed herein such as spool speed (N). In some examples, the predefined threshold evaluated at step 96 is another predefined time threshold with respect to an elapsed time relative to the commencement of step 91 and/or step 95, for example. Step 96 can include verification of the engine light-off condition or another engine operational condition of the engine using one or more other conditions than utilize to detect the engine light-off condition, such as a rise in EGT. Step 96 can include determining that the present rotational speed (N) of the gas turbine engine component meets a second predefined threshold, which can be greater than the first predefined threshold utilized in steps 93 and 94.

At step 97, the starter can be commanded to operate at a relatively higher torque setting in response to determining that each respective predetermined criterion is met at step 96. The relatively higher torque setting can be a maximum torque output of the starter. Step 97 includes causing the flow rate and/or pressure between the fluid source and starter to increase in response to determining that the engine light-off condition has occurred, and can include causing an increase in acceleration of the starter. Step 91 and/or step 97 can include causing the flow rate and/or pressure to increase such that the starter to approaches a maximum torque output.

At step 98, the starter can be commanded to operate at a zero torque setting to cease to provide power to the gas turbine engine component to transition from an engine start mode or sequence to an engine operating mode. Thereafter, the algorithm can return to step 91 to enter into the engine start mode.

FIGS. 7-12 illustrate other starter assembly arrangements. The disclosed starter assemblies of FIGS. 7-12 (indicated at 260, 360, 460, 560, 660, 760) can be utilized to control a hydraulic or fluid-actuated starter for a gas turbine engine, such as the engines 20, 120 of FIGS. 2 and 3.

Figure 7:
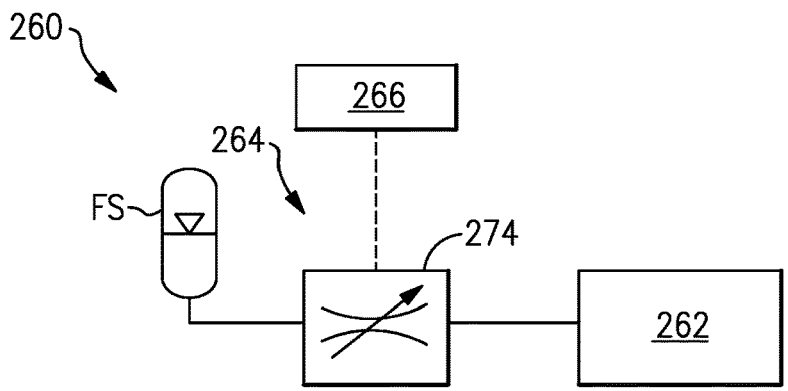
FIGS. 7 to 12 illustrate other exemplary starter assemblies for a gas turbine engine.

In the illustrated example of FIG. 7, valve assembly 264 includes at least one adjustable flow control or servo valve 274 electrically coupled to controller 266. The servo valve 274 can be infinitely variable or otherwise moveable between a plurality of continuous flow and/or pressure positions or settings to meter flow between fluid source FS and starter 262 in response to one or more command signals from the controller 266.

Figure 8:
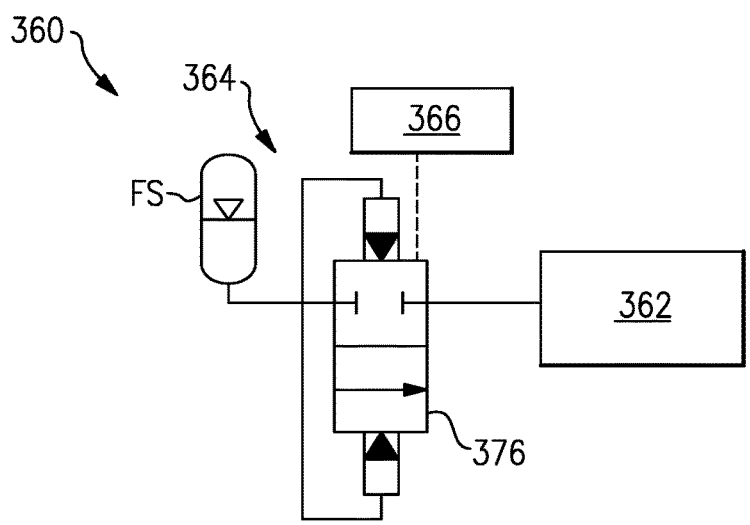

In the illustrated example of FIG. 8, valve assembly 364 includes at least one pulse width modulated (PWM) valve 376 electrically coupled to controller 366. Valve 376 can be infinitely variable and is moveable at different rates between restricted and unrestricted flow positions in response to a PWM command signal. The controller 366 is operable to communicate the PWM command signal to the valve 376 to meter flow between fluid source FS and starter 362.

Figure 9:
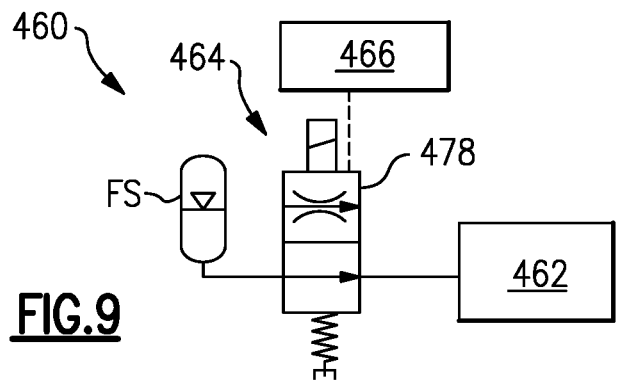

In the illustrated example of FIG. 9, valve assembly 464 includes at least one fixed flow control or solenoid valve 478 electrically coupled to controller 466 to meter flow to starter 462. Valve 478 is a multi-stage, two-position valve moveable between two discrete positions to permit full flow (as shown) and to restrict flow through an orifice. The solenoid valve 478 can be normally de-energized to permit full flow, for example.

Figure 10:
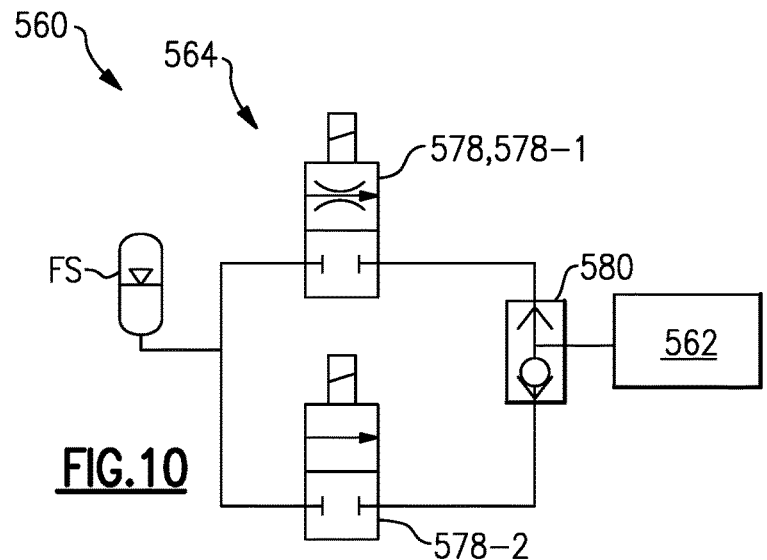

In the illustrated example of FIG. 10, valve assembly 564 includes a plurality of solenoid valves 578, including a first and second solenoid valves 578-1, 578-2 in parallel that fluidly interconnect fluid source FS and starter 562 via a shuttle valve 580. Valves 578-1, 578-2 can be two-position valves. Solenoid valve 578-1 can be moveable between two discrete positions in response to energizing and de-energizing the solenoid valve 578-1 to permit flow and to block or otherwise restrict flow through an orifice.

The solenoid valves 578-1, 578-2 establish respect flow paths between the fluid source FS and starter 562. A first rate of fluid flow is established by the first valve 578-1 when in a first position, such as when the solenoid vale 578-1 is energized. A second rate of fluid flow is established by the second valve 578-2 when in a second position, such as when the solenoid valve 578-2 is energized. The second rate of fluid flow can be relative lesser or greater than the first rate of fluid flow. For example, the first position of valve 578-1 can define a restricted flow for a high-altitude starting mode, and a first position of valve 578-2 can define full flow at sea-level. Shuttle valve 580 is operable to permit only one of the respective flow paths to communicate flow to the starter 562 based on pressures sensed at respective inlets of the shuttle valve 580 coupled to the valves 578-1, 578-2.

Figure 11:
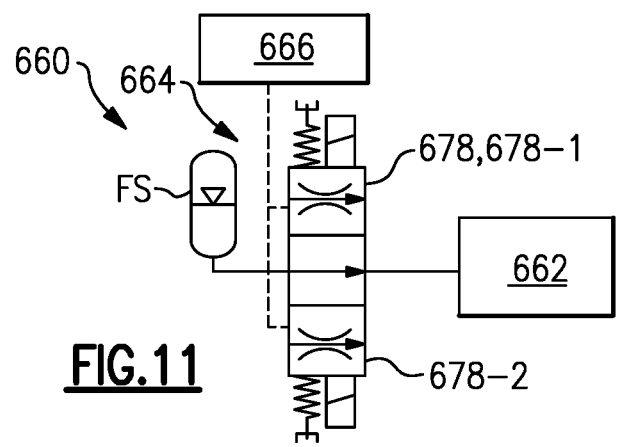

In the illustrated example of FIG. 11, valve assembly 664 includes a plurality of solenoid valves 678 coupled to controller 666, including a first and second solenoid valves 678-1, 678-2 that fluidly interconnect fluid source FS and starter 662. Valves 678-1, 678-2 are arranged in a stacked relationship to define three discrete positions of the valve assembly 664. Valve 678-1 can be moveable to restrict flow through an orifice at a first level (e.g., heavy restriction), and valve 678-2 can be moveable to restrict flow through an orifice at a second, different level (e.g., moderate restriction). Valves 678-1, 678-2 can be normally de-energized to permit full flow between the fluid source FS and starter 662, for example.

Figure 12:
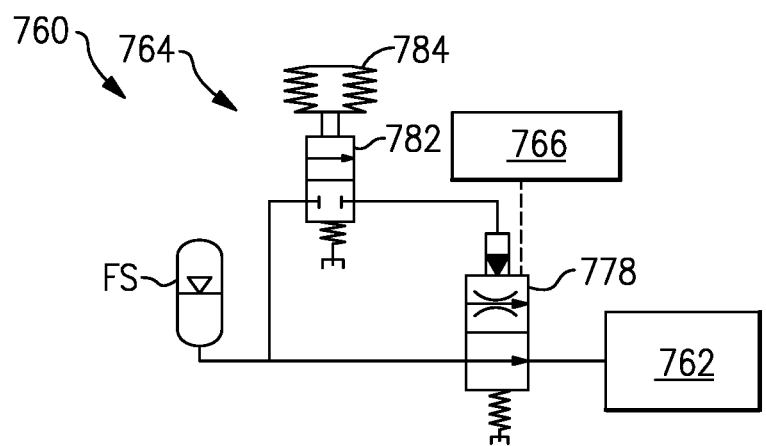

In the illustrated example of FIG. 12, valve assembly 764 includes starter 762, at least one solenoid valve 778 electrically coupled to controller 766 and another valve 782. Valve 782 can be a two-position valve. Valve assembly 764 can include an altitude bellows 784 that senses an altitude of the engine or aircraft. The altitude bellows 784 is operable to move valve 782 to modulate flow of fluid to the valve 778 in response to a change in altitude.

It should be understood that relative positional terms such as "forward," "aft," "upper," "lower," "above," "below," and the like are with reference to the normal operational attitude of the vehicle and should not be considered otherwise limiting.

Although the different embodiments and examples have the specific components shown in the illustrations, embodiments of this disclosure are not limited to those particular combinations. It is possible to use some of the components or features from one of the embodiments and examples in combination with features or components from another one of the embodiments and examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A starter assembly for a gas turbine engine comprising:
   a fluid-actuated starter coupled to a spool, the fluid-actuated starter being moveable to define a minimum torque output and a maximum torque output; and
   a controller configured to:
   cause a reduction in torque output of the fluid-actuated starter in response to determining that a rotational speed of the spool meets a first predefined threshold; and
   cause an increase in torque output of the fluid-actuated starter in response to determining that the rotational speed of the spool meets a second predefined threshold subsequent to the first predefined threshold being met, the second predefined threshold being greater than the first predefined threshold, the increase in torque output being one of (1) a step-wise increase in torque output until the torque output approaches the maximum torque output, the step-wise increase comprising a plurality of step increases in torque output or (2) a continuous increase in torque output until the torque output approaches the maximum torque output,
   wherein the first predefined threshold and the second predefined threshold define a light-off speed range.

2. The starter assembly as recited in claim 1, wherein the light-off speed range relates to an engine light-off condition.

3. The starter assembly as recited in claim 1, further comprising a variable speed pump driven by a motor, wherein the controller is configured to modulate a speed of the motor to adjust a flow rate of fluid between a fluid source and the fluid-actuated starter.

4. The starter assembly as recited in claim 1, further comprising a valve assembly coupled to the fluid-actuated starter, wherein the controller is configured to move the valve assembly to cause a flow rate of fluid between a fluid source and the fluid-actuated starter to change in response to the first predefined threshold being met.

5. The starter assembly as recited in claim 4, wherein the valve assembly includes at least one servo valve electrically coupled to the controller.

6. The starter assembly as recited in claim 4, wherein the valve assembly includes at least one pulse width modulated (PWM) valve electrically coupled to the controller.

7. The starter assembly as recited in claim 4, wherein the spool is a portion of an auxiliary power unit.

8. The starter assembly as recited in claim 6, wherein the controller is configured to cause the fluid-actuated starter to operate at the maximum torque output to overcome an inertia of the gas turbine engine at rest prior to the first predefined threshold being met, and the controller is configured to cause the reduction in the torque output of the fluid-actuated starter from the maximum torque output in response to determining that the first predefined threshold is met.

9. The starter assembly as recited in claim 8, further comprising a variable speed pump driven by a motor, wherein the variable speed pump is continuously variable over a range of speeds, and wherein the controller is configured to modulate a speed of the motor to adjust a flow rate of fluid between a fluid source and the fluid-actuated starter.

10. The starter assembly as recited in claim 4, wherein the valve assembly includes at least one solenoid valve electrically coupled to the controller.

11. The starter assembly as recited in claim 10, wherein the at least one solenoid valve includes a first solenoid valve and a second solenoid valve, the flow rate of fluid including a first rate and a second rate greater than the first rate, the first rate defined by the first solenoid valve and the second rate defined by the second solenoid valve.

12. The starter assembly as recited in claim 10, wherein the valve assembly includes an altitude bellows that modulates flow of fluid to the at least one solenoid valve.

13. A gas turbine engine assembly comprising:
a gas turbine engine comprising:
    a spool including a turbine section driving a compressor section or a fan; and
    a combustor section including a combustor in fluid communication with the compressor and the turbine; and
a starter assembly comprising:
    a fluid-actuated starter mechanically coupled to the spool and fluidly coupled to a fluid source, the fluid-actuated starter being moveable to define a minimum torque output and a maximum torque output; and
    a controller configured to:
        vary a flow rate of fluid between the fluid source and the fluid-actuated starter to cause a reduction in torque output of the fluid-actuated starter in response to determining that a rotational speed of the spool meets a first predefined threshold; and
        vary the flow rate of fluid between the fluid source and the fluid-actuated starter to cause an increase in torque output of the fluid-actuated starter in response to determining that the rotational speed of the spool meets a second predefined threshold subsequent to the first predefined threshold being met, the second predefined threshold being greater than the first predefined threshold, the increase in torque output being one of (1) a step-wise increase in torque output until the torque output approaches the maximum torque output, the step-wise increase comprising a plurality of step increases in torque output or (2) a continuous increase in torque output until the torque output approaches the maximum torque output,
    wherein the first predefined threshold and the second predefined threshold define a light-off speed range.

14. The gas turbine engine assembly as recited in claim 13, wherein the gas turbine engine is an auxiliary power unit.

15. The gas turbine engine assembly as recited in claim 13, wherein the controller is configured to cause the fluid-actuated starter to operate at the maximum torque output to overcome an inertia of the gas turbine engine at a rest condition prior to the first predefined threshold being met.

16. The gas turbine engine assembly as recited in claim 15, wherein the controller is configured to cause the reduction in torque output of the fluid-actuated starter from the maximum torque output in response to determining that the first predefined threshold is met.

17. The gas turbine engine assembly as recited in claim 16, wherein the gas turbine engine is an auxiliary power unit.

18. The gas turbine engine assembly as recited in claim 17, wherein the controller is configured to set the torque output of the fluid-actuated starter based on an altitude of the gas turbine engine.

19. The gas turbine engine assembly as recited in claim 17, wherein the controller is configured to cause the fluid-actuated starter to operate at a zero torque output, subsequent to the fluid-actuated starter approaching the maximum torque output, to cease to provide power to the gas turbine engine.

20. The gas turbine engine assembly as recited in claim 17, wherein the auxiliary power unit is configured to drive a gearbox.

* * * * *